United States Patent [19]

Crivello et al.

[11] Patent Number: 5,314,929
[45] Date of Patent: May 24, 1994

[54] RAPIDLY CURABLE VINYL ETHER RELEASE COATINGS

[75] Inventors: James V. Crivello, Clifton Park, N.Y.; James A. Dougherty, Pequannock, N.J.

[73] Assignee: ISP Investments Inc., Wilmington, Del.

[21] Appl. No.: 926,425

[22] Filed: Aug. 10, 1992

[51] Int. Cl.$^5$ .......................... C08F 2/50; C08F 16/18; C08F 216/18
[52] U.S. Cl. ..................................... 522/31; 522/181; 526/333; 526/334
[58] Field of Search .................. 522/181, 31; 526/332, 526/333, 334

[56] References Cited

U.S. PATENT DOCUMENTS

| | | | |
|---|---|---|---|
| 2,104,000 | 12/1937 | Reppe | 526/332 |
| 2,518,321 | 8/1950 | Hoover | 526/333 |
| 4,069,056 | 1/1978 | Crivello | 522/31 |
| 4,438,234 | 3/1984 | Rosenquist | 524/378 |
| 4,845,265 | 7/1989 | Lapin | 560/84 |
| 5,010,118 | 4/1991 | Desorcie | 522/31 |
| 5,045,572 | 9/1991 | Plotkin | 522/181 |
| 5,139,872 | 8/1992 | Lapin | 522/181 |

FOREIGN PATENT DOCUMENTS 844694 6/1970 Canada .
447115 9/1991 European Pat. Off. .

Primary Examiner—Marion E. McCamish
Assistant Examiner—Arthur H. Koeckert
Attorney, Agent, or Firm—Marilyn J. Maue; Joshua J. Ward

[57] ABSTRACT

The present invention relates to a rapidly curable, silicone-free release coating composition comprising (a) between about 50 and about 95 wt. % of a vinyl ether having the formula $C_nH_{2n+1}O-CH=CH_2$ wherein n has a value of from 8 to 20, optionally containing a cationically polymerizable comonomer; (b) between about 5 and about 50 wt. % of a multifunctional vinyl ether monomer and (c) between about 0.1 and about 10 wt. % of an onium salt photoinitiator.

12 Claims, No Drawings

RAPIDLY CURABLE VINYL ETHER RELEASE COATINGS

In one aspect, the invention applies to a cationically curable release composition which contains no silicone component and which is rapidly curable by exposure to ultraviolet light.

In another aspect the invention relates to a commercially feasible and economically prepared release coating composition which is substantative to all conventional substrates.

BACKGROUND OF THE INVENTION

Release coatings are substances which control or eliminate the adhesion between an adhesive and a substrate surface, many of which have been prepared using silicone based materials. Curing of such silicone based liquid release coatings has been accomplished by solvent removal and thermal crosslinking, as is taught in U.S. Pat. No. 4,151,344. However the removal of solvent is not only energy intensive but also raises environmental concerns over solvent removal and recovery. To obviate this disadvantage, solvent free "100% reactive" organo polysiloxane compositions such as those taught in U.S. Pat. No. 4,057,596 have been developed. These coatings, based on platinum catalyzed hydrosilation reactions, address the issue of solvent omission but are nevertheless energy intensive. Additionally, curing temperatures are typically within the range of from 140° to 160° C., thus precluding their use on temperature sensitive substrates. When applied to paper at these temperatures, the release coated paper has a tendency to curl and drastically change dimensions during thermal cure as dehydration of the paper substrate takes place. UV-curable release coatings in the absence of solvent is therefore desirable, since these coatings can be cured at room temperature.

Free radical initiated systems based on thiol-ene reactions are described in U.S. Pat. No. 3,816,282. These systems, however, have an offensive mercaptan odor; moreover, thiol-ene systems are known to cure slowly and are thus commercially not attractive. Although the cationically curable epoxy and vinyloxy organo polysiloxanes described (U.S. Pat. Nos. 4,617,238 and 4,279,717) cure rapidly with UV exposure and provide excellent low or "easy" release, in practice these UV-curable release coatings have several limitations. First, while UV-curable silicone release coatings can readily provide a low energy surface for easy release, coating formulations with controllable level of release are difficult to achieve. Attempts to counter this with control release additives have been only partially successful in developing moderate release properties. Secondly, many potential consumers object to silicone based products because of potential contamination of conventional components in coating lines. Specifically, silicones can cause adhesion and wetting problems when present as a contaminant in protective coating resins. Also, the UV curing of silicone-based release agents exhibit a strong substrate dependence. Finally, silicones are fairly expensive and their compositions are less economically attractive than other organic resins.

An example of a UV-curable non-silicone release coating has been reported (U.S. Pat. No. 4,319,974) which employs mixtures of $C_{(8-28)}$ alpha olefin oxides. These are reported to be useful in paper release applications. However, the cationic polymerization of alpha olefin oxides is much slower than UV-curable silicones.

Accordingly, it is an object of this invention to obviate the above problems and to provide a rapidly curable release composition which is economically prepared and used as a release coating.

Another object of this invention is to provide a release coating composition which can be adapted to possess easy, moderate, or strong release properties.

Still another object is to provide a release coating which may be applied to a wide variety of substrates and can be rapidly cured at about room temperature.

Yet another object is to provide a silicone free release coating composition.

These and other objects of the invention will become apparent from the following description and disclosure.

THE INVENTION

In accordance with this invention there is provided a silicone free, cationically curable release coating composition which comprises (a) between about 50 and about 95 wt. % of an alkyl vinyl ether monomer having the formula $C_nH_{2n+1}O-CH=CH$ or a blend thereof, wherein n has a value of from 8 to 20 and which optionally contains a monofunctional, cationically polymerizable comonomer; (b) between about 5 and about 50 wt. % of a poly(vinyl ether) monomer and (c) between about 0.5 and about 10 wt. 4 of onium salt initiator. The preferred proportions of composition components are from 70 to 90 wt. % of (a); from 10 to 30 wt. % of (b) and from 0.1 to 3 wt. % of (c).

The above compositions may also optionally contain one or more inactive adjuvants, in a concentration up to about 5 wt. % of the composition. Such include an inert filler or extender, e.g. fumed silica or low molecular weight polymers; thickening agents such as those of the cellulose type, e.g. Klucel to regulate viscosity according to desired needs and other inactive additives including a surfactant and the like.

Preferred species of the alkyl vinyl ethers are those wherein n is at least 12 and include lauryl vinyl ether, cetyl vinyl ether and octadecyl vinyl ether. The alkyl vinyl ether component (a) of this invention can also contain up to 50%, of a monoolefinic comonomer such as hydroxy butyl vinyl ether, cyclohexyl vinyl ether, phenoxy vinyl ether, 2-ethylhexyl vinyl ether, epoxy monomers and/or oligomeric resins.

The poly(vinyl ether) monomers, or crosslinking agent, of component (b) include the divinyl ethers of hexanediol, cyclohexane dimethanol, triethylene glycol, tetraethylene glycol, and other conventional poly(vinyl ether) crosslinking agents. Of these, the divinyl ethers of triethylene glycol and cyclohexane dimethanol are most preferred.

The onium salt photoinitiators of this invention are those which are soluble or at least highly miscible in the release coating mixture and are represented by the general formula

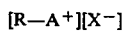

wherein R is an aromatic radical selected from the group of aryl, alkaryl, aralkyl, which includes mono-, di- or fused ring structures and is optionally substituted with a linear, branched or cyclic $C_8$ to $C_{20}$ radical of alkyl, alkylene, alkoxy, alkyleneoxy, a nitrogen, oxygen or sulfur heterocyclic radical of 4 to 6 carbon atoms in the ring; or a mixture thereof. $A^+$ is selected from the group of iodonium cation monosubstituted with $C_1$ to $C_{20}$ alkyl or aryl optionally substituted with $C_1$ to $C_{20}$ alkyl or alkoxy and sulfonium cation disubstituted with $C_1$ to $C_{20}$ alkyl or aryl optionally substituted with $C_1$ to $C_{20}$ alkyl or alkoxy or a mixture thereof and $X^-$ is a non-basic, non-nucleophilic anion, examples of which include $SbF_6^-$, $AsF_6^-$, $PF_6^-$, $BF_4^-$, $ClO_4^-$, $CF_3SO_3^-$ and the like.

These UV photoinitiators include those which absorb in the mid and far ultraviolet ranges of the spectrum and can have their absorption capability extended by incorporating known sensitizers as taught in Crivello and Lam, Journal of Polymer Science, 17, 1059 (1979) and Crivello and Lam, Journal of Polymer Science, 16, 2441 (1978).

Preferred onium salt photoinitiators include bisaryliodonium salts represented by the following formula:

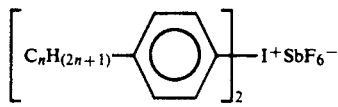

alkoxy substituted iodonium salts represented by the formula:

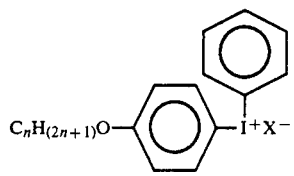

and

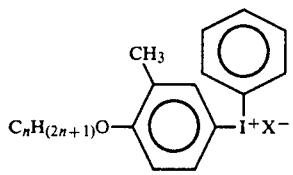

and alkoxy substituted sulfonium salts represented by the formula:

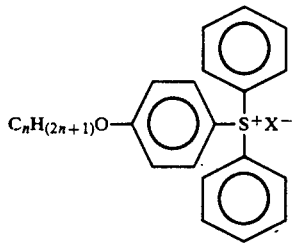

wherein n has a value of from 12 to 18 and $X^-$ is $SbF_6^-$, $AsF_6^-$ or $PF_6^-$.

The most preferred photoinitiator is represented by the formula:

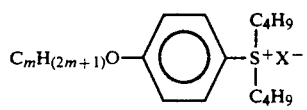

where m has a value of from 16 to 18.

The UV curable compositions can be applied to a substrate such as glass, metal, a polyester or polyethylene film, polyethlene coated kraft paper, supercalendered kraft paper, or any other conventional substrate in a thickness of from about 0.04 to about 5.0 mil, preferably from about 0 .1 to about 1.0 mil at about room temperature, and cured by exposure to UV light or other source of radiation such as an electron beam, gamma radiation or laser emination to form a release coated substrate within less than 1 minute, usually within less than 5 seconds.

The present composition is readily adaptable to various degrees of release which may be required by a consumer. Specifically the peel strength varies inversely with the length of the alkyl chain in the alkyl vinyl ether component (a) and/or conversely with the degree of crosslinking induced by component (b). Thus, long chain length and/or a low degree of crosslinking provides coatings which are more easily released.

Having generally described the invention, reference is now had to the accompanying examples which illustrate preferred embodiments but which are not to be construed as limiting to the scope of the invention as more broadly described above and in the appended claims.

EXAMPLE 1

Dodecyl vinyl ether (80 parts) is mixed with triethylene glycol divinyl ether (20 parts) and an iodonium salt photoinitiator (1 port) having the structure:

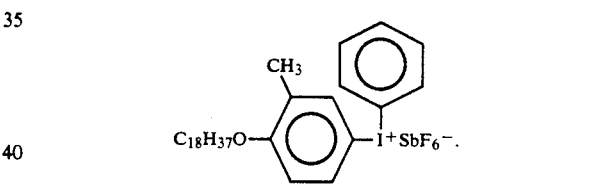

The mixture is warmed to 120° C. and agitated to dissolve the photoinitiator and maintained at that temperature for 1 minute to insure homogeneity. A uniform coating of approximately 0.5 mil is then coated on a polyester substrate using a No. 6 Mayer bar and exposed to 400 mJ/cm² dosage from a medium pressure mercury vapor lamp to form a tack-free coating within a few seconds. The cured coating could not be smeared by touch and could not be rubbed off by gentle pressure. Avery pressure sensitive labels and Scotch brand adhesive tapes adhered to the coated surface but could be easily removed without any visible change to the coated surface or the adhesive tape. The removed tape was tested for migration by folding it back on itself. The strong adhesive bond formed indicates no migration and the ability to be reaffixed to the substrate.

EXAMPLE 2

Example 1 is repeated except that dodecyl vinyl ether is replaced with cetyl vinyl ether. After exposure to UV light, the tack-free coating is left under ambient conditions for 24 hours. Scotch tape, which had been applied the surface, is easily removed and can be reapplied to another substrate such as paper without any loss of adhesion.

COMPARATIVE EXAMPLE 3

Example I is repeated except that the triethylene glycol divinyl ether is omitted from the release composition. After exposure to UV light, a soft coating, easily smeared by light finger pressure, and unsuitable as a release coating is formed. This example illustrates the need for a multi-functional vinyl ether comonomer.

EXAMPLE 4

Release coatings, prepared by blending dodecyl vinyl ether (0.38 equivalents) with triethylene glycol divnyl ether (0.20 equivalents) and the cationic photoinitiators (0.00058 equivalents) having the following structure:

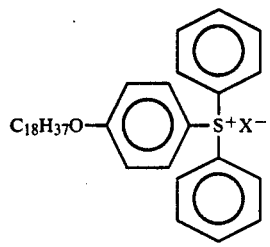

where $X^-$ is $SbF_6^-$, $AsF_6^-$, $PF_6^-$, $ClO_4^-$, and $CF_3SO_3^-$ were compared for cure speed. Coating were applied to polyester in a thickness of 0.5 mil and exposed to UV irradiation on a variable speed conveyor. All formulations cured to form release coatings. The maximum conveyor speed at which smear free coatings were obtained are shown below:

| $X^-$ | Max. Conveyor Speed |
|---|---|
| $SbF_6^-$ | 700 ft/min |
| $AsF_6^-$ | 500 ft/min |
| $PF_6^-$ | 500 ft/min |
| $ClO_4^-$ | 350 ft/min |
| $CF_3SO_3^-$ | 350 ft/min |

EXAMPLE 5

Release coatings were prepared using alkyl vinyl ethers of varying alkyl chain length between $C_{12}$ to $C_{18}$ in the following general formulae:
0.27 equivalents alkyl vinyl ether
0.20 equivalents cyclohexane dimethanol divinyl ether
0.5 wt. % photoinitiator of Example 1
Coatings were cast on a polyester sheet to a thickness of 0.5 mil and cured by exposure to 400 $mJ/cm^2$ from a medium pressure mercury vapor lamp. After 24 hours, Scotch #610 tape was applied to the surface and a 5 pound rubber roller was rolled over the tape 5 times. The force required to remove the tape at an angle of 180° was measured using a GARDNER Slip/Peel Tester. Results, summarized below demonstrate that release can be readily modified by varying chain length of the alkyl vinyl ether.

| CHAIN LENGTH (n) | RELEASE (gm/lin) |
|---|---|
| 12 | 525 |
| 16 | 358 |
| 18 | 317 |

EXAMPLE 6

Example 1 is repeated except the photoinitiator is replaced with an equivalent amount of a photoinitiator having the following structure:

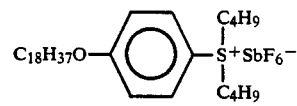

After slight warming to 40° C. to promote dissolution of the photoinitiator, this formula was allowed to cool to room temperature. Unlike previous examples, the photoinitiator was found to be completely soluble in release coating formulations at room temperature.

EXAMPLE 7

Release coatings were prepared by blending dodecyl vinyl ether with varying ratios of triethylene glycol divinyl ether crosslinking agent. The release composition also contained 3 phr (parts per hundred resin) fumed silica and 1 phr photoinitiator of Example 6. Coatings were applied to polyester and cured by exposure to 400 $mJ/cm^2$ from a medium pressure mercury vapor lamp. Release of Scotch #610 tape was determined as in Example 5. Results demonstrate that the level of release is also readily controlled by the amount of crosslinking agent incorporated in the composition.

| % CROSSLINKER | RELEASE (gm/lin) |
|---|---|
| 10 | 93 |
| 20 | 190 |
| 30 | 292 |
| 50 | 473 |

EXAMPLE 8

A release coating was repared containing 80% dodecyl vinyl ether monomer and lot hydroxybutyl vinyl ether comonomer, 10% hexanediol divinyl ether, and 1 phr of the photoinitiator used in Example 6. The coating was applied to polyester and cured as above. Good adhesion of Scotch #610 tape and smooth tape release (178 gm/lin) was achieved. In this example hydroxy butyl vinyl ether was incorporated into release coating formulae to improve adhesion of the coating to the polyester.

It will be understood that the substitution of other monovinyl ethers or their mixtures and other crosslinking agents as well as the other onium initiators of this invention can be substituted in the above examples to provide good release coatings described herein.

What is claimed is:

1. A solventless, silicone free, UV curable release coating composition consisting essentially of:
(a) between about 50 and about 95 wt. % of an alkyl vinyl ether having the formula $C_nH_{2n+1}O-CH=CH_2$ where n has a value of from 12 to 20 and optionally containing up to 50 wt. % of a cationically polymerizable conomoner;
(b) between about 5 and about 50 wt. % of a poly(vinyl ether) crosslinking agent and
(c) between about 0.1 and about 10 wt. % of an onium salt initiator having the formula $[R-A^+][X^-]$ wherein R is an aromatic radical selected from the group of aryl, alkaryl, aralkyl which includes mono-, di- or fused ring structures and is optionally substituted with a linear, branched or cyclic $C_8$ to $C_{18}$ radical of alkyl, alkylene, alkoxy, alkyleneoxy, a nitrogen, oxygen or sulfur heterocyclic radical or a mixture thereof; $A^+$ is selected from the group of iodonium cation monosubstituted with $C_1$ to $C_{20}$ alkyl or aryl optionally substituted with $C_1$ to $C_{20}$ alkyl or alkoxy and sulfonium cation distributed with $C_1$ to $C_{20}$ alkyl or aryl optionally substituted with $C_1$ to $C_{20}$ alkyl or alkoxy or a mixture thereof and $X^-$ is a non-basic, non-nucleophilic anion.

2. The composition of claim 1 wherein component (a) is an alkyl vinyl ether wherein n has a value of from 12 to 18.

3. The composition of claim 2 wherein component (a) is a mixture of alkyl vinyl ethers.

4. The composition of claim 1 wherein component (a) is a mixture of dodecyl vinyl ethers and hydroxybutyl vinyl ether.

5. The composition of claim 1 wherein component (b) is triethylene glycol divinyl ether.

6. The composition of claim 1 wherein component (b) is divinyl ether ethylene glycol.

7. The composition of claim 1 wherein component (c) has the formula

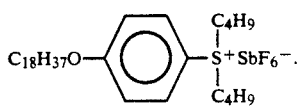

8. The composition of claim 1 wherein component (c) has the formula

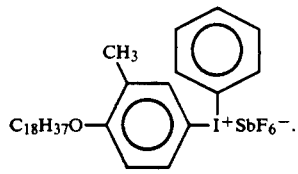

9. The composition of claim 1 wherein component (c) has the formula

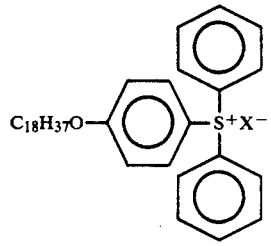

10. The process which comprises:
(a) coating the surface of a substrate with the solventless composition of claim 1 and
(b) irradiating the coated substrate with a source of radiation at about room temperature until said substrate surface is rendered tack-free.

11. The process of claim 10 wherein said surface is coated with the composition of claim 1 wherein (a) is a mixture of $C_{14}$ to $C_{20}$ vinyl ethers.

12. The release coating product of either claim 10 or 11.